United States Patent
Gandhi et al.

(10) Patent No.: US 10,295,965 B2
(45) Date of Patent: May 21, 2019

(54) APPARATUS AND METHOD FOR MODEL ADAPTATION

(71) Applicant: GE Intelligent Platforms, Inc., Charlottesville, VA (US)

(72) Inventors: Devang Jagdish Gandhi, Lisle (IL); James Paul Herzog, Downers Grove, IL (US)

(73) Assignee: GE INTELLIGENT PLATFORMS, INC, Charlottesville, VA (US)

( * ) Notice: Subject to any disclaimer, the term of this patent is extended or adjusted under 35 U.S.C. 154(b) by 282 days.

(21) Appl. No.: 14/916,430

(22) PCT Filed: Sep. 6, 2013

(86) PCT No.: PCT/US2013/058418
§ 371 (c)(1),
(2) Date: Mar. 3, 2016

(87) PCT Pub. No.: WO2015/034512
PCT Pub. Date: Mar. 12, 2015

(65) Prior Publication Data
US 2016/0195857 A1 Jul. 7, 2016

(51) Int. Cl.
G05B 13/02 (2006.01)
G05B 13/04 (2006.01)
G05B 23/02 (2006.01)

(52) U.S. Cl.
CPC ....... G05B 13/041 (2013.01); G05B 23/0262 (2013.01)

(58) Field of Classification Search
CPC .......... G05B 1/00; G05B 13/00; G05B 17/00; G05B 13/041; G05B 13/042; G05B 15/00;
(Continued)

(56) References Cited

U.S. PATENT DOCUMENTS 3,045,221 A 7/1962 Roop
3,561,237 A 2/1971 Eggers et al.
(Continued)

FOREIGN PATENT DOCUMENTS

CN 1495584 A 5/2004
CN 1867876 A 11/2006
(Continued)

OTHER PUBLICATIONS

Machine Translation and First Office Action and Search issued in connection with corresponding CN application No. 201380080800.2 dated Jul. 20, 2017.

*Primary Examiner* — Hsien Ming Lee
(74) *Attorney, Agent, or Firm* — GE Global Patent Operation; Scott R. Stanley (57) ABSTRACT

A vector of actual sensor values is received. A maturity of a model is determined and the maturity is defined for sensors. A function that translates model maturity to model range inhibition measure is determined. A model range inhibition (MRI) measure is determined. An MRI limit based upon the MRI measure is determined. The received vector is compared to the MRI limit and the model is selectively changed based upon the comparing. In other aspects, vectors are received having actual values of driver and response sensors. A function that provides a set of boundaries between acceptable observations and unacceptable observations is also determined. Measures of similarity between vectors are determined. The measures of similarity and the function are compared and the model is selectively changed based upon the comparing.

14 Claims, 9 Drawing Sheets (58) Field of Classification Search
CPC ........ G05B 15/02; G05B 17/02; G05B 19/00; G05B 19/02; G05B 19/0407
USPC .............................. 700/28–33, 50, 108, 110
See application file for complete search history.

(56) References Cited

U.S. PATENT DOCUMENTS

| | | |
|---|---|---|
| 3,767,900 A | 10/1973 | Chao et al. |
| 3,928,022 A | 12/1975 | Langagne |
| 4,060,716 A | 11/1977 | Pekrul et al. |
| 4,215,412 A | 7/1980 | Bernier et al. |
| 4,336,595 A | 6/1982 | Adams et al. |
| 4,368,510 A | 1/1983 | Anderson |
| RE31,750 E | 11/1984 | Morrow |
| 4,480,480 A | 11/1984 | Scott et al. |
| 4,517,468 A | 5/1985 | Kemper et al. |
| 4,639,882 A | 1/1987 | Keats |
| 4,937,763 A | 6/1990 | Mott |
| 5,109,700 A | 5/1992 | Hicho |
| 5,223,207 A | 6/1993 | Gross et al. |
| 5,586,066 A | 12/1996 | White et al. |
| 5,610,339 A | 3/1997 | Haseley et al. |
| 5,689,434 A | 11/1997 | Tambini et al. |
| 5,710,723 A | 1/1998 | Hoth et al. |
| 5,764,509 A | 6/1998 | Gross et al. |
| 5,774,379 A | 6/1998 | Gross et al. |
| 5,808,903 A | 9/1998 | Schiltz et al. |
| 5,842,157 A | 11/1998 | Wehhofer et al. |
| 5,917,428 A | 6/1999 | Discenzo et al. |
| 5,943,634 A | 8/1999 | Piety et al. |
| 5,987,399 A | 11/1999 | Wegerich et al. |
| 6,041,287 A | 3/2000 | Dister et al. |
| 6,108,616 A | 8/2000 | Borchers et al. |
| 6,567,752 B2 | 5/2003 | Cusumano et al. |
| 6,591,166 B1 | 7/2003 | Millett et al. |
| 6,591,296 B1 | 7/2003 | Ghanime |
| 6,609,036 B1 | 8/2003 | Bickford |
| 6,609,212 B1 | 8/2003 | Smith |
| 6,678,639 B2 | 1/2004 | Little et al. |
| 6,859,739 B2 | 2/2005 | Wegerich et al. |
| 6,898,469 B2 | 5/2005 | Bickford |
| 7,016,816 B2 | 3/2006 | Mott |
| 7,233,886 B2 | 6/2007 | Wegerich et al. |
| 7,403,869 B2 | 7/2008 | Wegerich et al. |
| 2004/0225911 A1 | 11/2004 | Smith |
| 2006/0047512 A1* | 3/2006 | Yuan ...................... G05B 17/02 704/244 |
| 2009/0062932 A1 | 3/2009 | Caldwell et al. |

FOREIGN PATENT DOCUMENTS

| | | |
|---|---|---|
| CN | 101937224 A | 1/2011 |
| WO | 1999036920 A1 | 7/1999 |

* cited by examiner

APPARATUS AND METHOD FOR MODEL ADAPTATION

BACKGROUND OF THE INVENTION

Field of the Invention

The subject matter disclosed herein relates to process models that are updating process models, and utilizing process models to detect and react to problems in control systems.

Brief Description of the Related Art

A variety of approaches have been used in industrial process control, machine control, system surveillance, and condition based monitoring that address various drawbacks of traditional sensor-threshold-based control and alarms used in these systems. More specifically, empirical models of the monitored process or machine are used in failure detection and control. Such models effectively leverage an aggregate view of surveillance sensor data to achieve much earlier incipient failure detection and finer process control. By modeling the many sensors on a process or machine simultaneously and in view of one another, the surveillance system can provide more information about how each sensor (and its measured parameter) ought to be behaving.

Actions can be taken if the expected behavior is different from the actual behavior. For example, a user might instigate various control actions of a modeled process or may need to replace a component that implements the process.

The above-mentioned models are effective only if they are accurate. For example, over time the information represented may drift or otherwise become inaccurate. Various previous techniques have been used to determine whether to change these models, but all of these approaches have suffered from various drawbacks. As a result, some user dissatisfaction with these previous approaches has resulted.

BRIEF DESCRIPTION OF THE INVENTION

The approaches described herein provide auto-adaptation approaches for modeling by providing models that are accurate. Consequently, determination of component failures and actions to take can be determined more accurately thereby increasing user satisfaction with these approaches.

In many of these embodiments, a vector of actual sensor values is received. A maturity of a model is determined and the maturity is defined for each of a plurality of sensors and is further defined in an upward direction and a downward direction for each sensor. Furthermore, a function that translates model maturity to model range inhibition measure is determined. A model range inhibition (MRI) measure based upon the maturity of the model and the determined function is also determined. Additionally, an MRI limit based upon the MRI measure is determined. The received vector is compared to the MRI limit and selectively changes the model based upon the comparing.

In other aspects, a first vector is received and the first vector has actual values for driver sensors. A second vector is received and the second vector has actual values for response sensors. A third vector is received and the third vector has an estimate values for driver sensors. A fourth vector is received and the fourth vector has an estimate values for response sensors. A function that provides a set of boundaries between acceptable observations and unacceptable observations is determined. A first measure of similarity between the first vector and the third vector is determined. A second measure of similarity between the second vector and the fourth vector is determined. The first measure of similarity, the second measure of similarity, and the function are compared and a model is selectively changed based upon the comparing.

In still other aspects, a determination is made as to whether a component represented by the model is near failure or where some control action needs to be performed. An alert to a user when the component is near failure (or where some control action needs to be performed) is generated. The alert to a user is presented on a graphical display medium to a user.

In others of these embodiments, an apparatus that is configured to determine whether to modify a process model includes an interface and a processor. The interface has an input and an output and the input is configured to receive a vector of actual sensor values and a maturity of a model. The maturity is defined for each of a plurality of sensors and further defined in an upward direction and a downward direction for each sensor.

The processor is coupled to the interface and is configured to determine a model range inhibition (MRI) measure based upon the maturity of the model and the determined function. The processor is configured to determine an MRI limit based upon the MRI measure, and compare the received vector to the MRI limit. The processor is configured to selectively change the model based upon the comparison via one or more control signals sent via output.

In some aspects, the interface is configured to further receive at the input a first vector. The first vector has actual values for driver sensors. The interface also receives a second vector and the second vector has actual values for response sensors. The interface also receives a third vector, the third vector has an estimate values for driver sensors. The interface further receives a fourth vector and the fourth vector has an estimate values for response sensors. The interface also receives a function that provides a set of boundaries between acceptable observations and unacceptable observations.

In other aspects, the processor is configured to determine a first measure of similarity between the first vector and the third vector, and a second measure of similarity between the second vector and the fourth vector. The processor is further configured to compare the first measure of similarity, the second measure of similarity, and the function and selectively change the model based upon the comparison.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Auto-adaptation approaches are provided that eliminate the majority of filtering and nearly all of the tuning required for training empirical models of a typical asset (e.g., a control system, sensors, or the like). In some aspects, these approaches provide a minimal asset implementation cost solution with little or no impact and stress on the customer or user for the initial implementation and for continued maintenance. auto-adaptation approaches are provided that achieve greater asset states domain coverage by optimally adapting into new untrained states (such as is the case for models build on little data, i.e., infant models, as well as when the asset behavior changes significantly even for mature models).

Advantageously, asset maintenance, ambient out-of-range determinations, load out-of-range and significant operational changes are also reduced by the present approaches. In some aspects, a platform is provided to bootstrap the empirical modeling portion of the asset monitoring with little training data.

In some of these examples, auto-adaptation includes a variety of different rules (e.g., two trigger rules and three inhibition rules). It will be appreciated that the number of rules and/or the number of rules that are triggers and inhibitions may vary. In one approach, the two trigger rules are used and these are the Out of Range Adaptation (ORA) trigger rule and the Driver-tags Similarity Adaptation (DSA) trigger rule. Further, three inhibition rules are used and these are the Limit Value Inhibition (LVI) inhibition rule, the Model Range Inhibition (MRI) rule, and the Fault-tags Similarity Inhibition (FSI) rule. The five rules are parameterized using two control parameters, five threshold parameters, and a set of boundary parameters (e.g., two per tag). Each of the rules includes characteristics and advantages. For instance, the MRI rule allows for a heuristic and rapid model growth. DSA and FSI ascribe to the heuristic as well as opportunistic nature of approach. These approaches ensure that all the new states that are adapted are driven by the tags that are considered as process drivers and responsible for navigating the asset through its valid state space, while inhibiting the states that are the deviations not in step with these drivers. It will be understood that various combinations of trigger rules and inhibition rules can be used and that the above-mentioned combination is only one example.

It will be appreciated that any numerical, data driven, modeling approach is subjected to a large model/asset implementation and model/asset maintenance overhead. Furthermore, the majority of these maintenance events are predicated by false positive indicators, which an analyst must first parse through and with expertise determine whether it is a real fault occurrence or a need for model maintenance (adaptation). During the asset implementation, after identification of the minimal set of modeling parameters (tags or sensors), users, clients, or customers are required to undergo a labor intensive process of pulling vast amounts of data, e.g., a year or more of data in some case. This large amount of data is pulled to ensure that the number of states available for initial model is maximized as well as reducing/eliminating the possibility of asking the customer for more data.

However, the majority of this data is typically eliminated due to various reasons, and the remainder of data often proves significantly different from the current state of the asset. The present approaches reduce the amount requested or completely eliminate this client or user involvement in the implementation processes, reducing the amount of implementation time (around 45% in some examples). Furthermore, the present approaches reduce the amount of false positives that are reported to the analyst by heuristically identifying them as new states and reduces the maintenance load of the analyst by rapidly and opportunistically auto-adapting the new states and updating the model.

It will be appreciated that the set of rules discussed herein are not exclusive and that other rules or other combinations of various types of rules may be used. Besides driver out of range, driver residual and driver similarity, there are many other measures that can be used to determine whether a model is not tracking the observed state. Measures such as a combined function of two or more of tags (sensors) can be used to determine if the asset has changed its operating space. Examples of such functions include a wind power curve or a pump curve. Another measure could be a long term trending of a control parameter can be used to indicate an equipment-ware related drift in the state space of the asset. The same techniques can also be applied to the inhibition rules to attribute the state change to an actual fault occurrence.

In some aspects, the FSI inhibition relation between the driver similarity and fault similarity is described by a linear function, but other functions (such as exponential functions) may be used. The inputs to the rules could also relate to the change is similarity measure (derivatives) instead of the similarity values themselves. The derivatives provide a rate at which the state space is changing and could be used to determine if the observed rate of change is typical of faults or new valid states.

In yet other aspects, the similarity operators used by DSA and FSI, can be replaced by many other measures of model quality, such as Euclidean distance measure (typically used in clustering methodology) or Hotelling's T-squared measure, between observation and either the estimate or the model/cluster parameter (such as a centroid). Such substitution will also allow for easily applying these rules to other numerical or parametric modeling techniques such as clustering, Principal Component Analysis (PCA), and neural networks.

Figure 1:
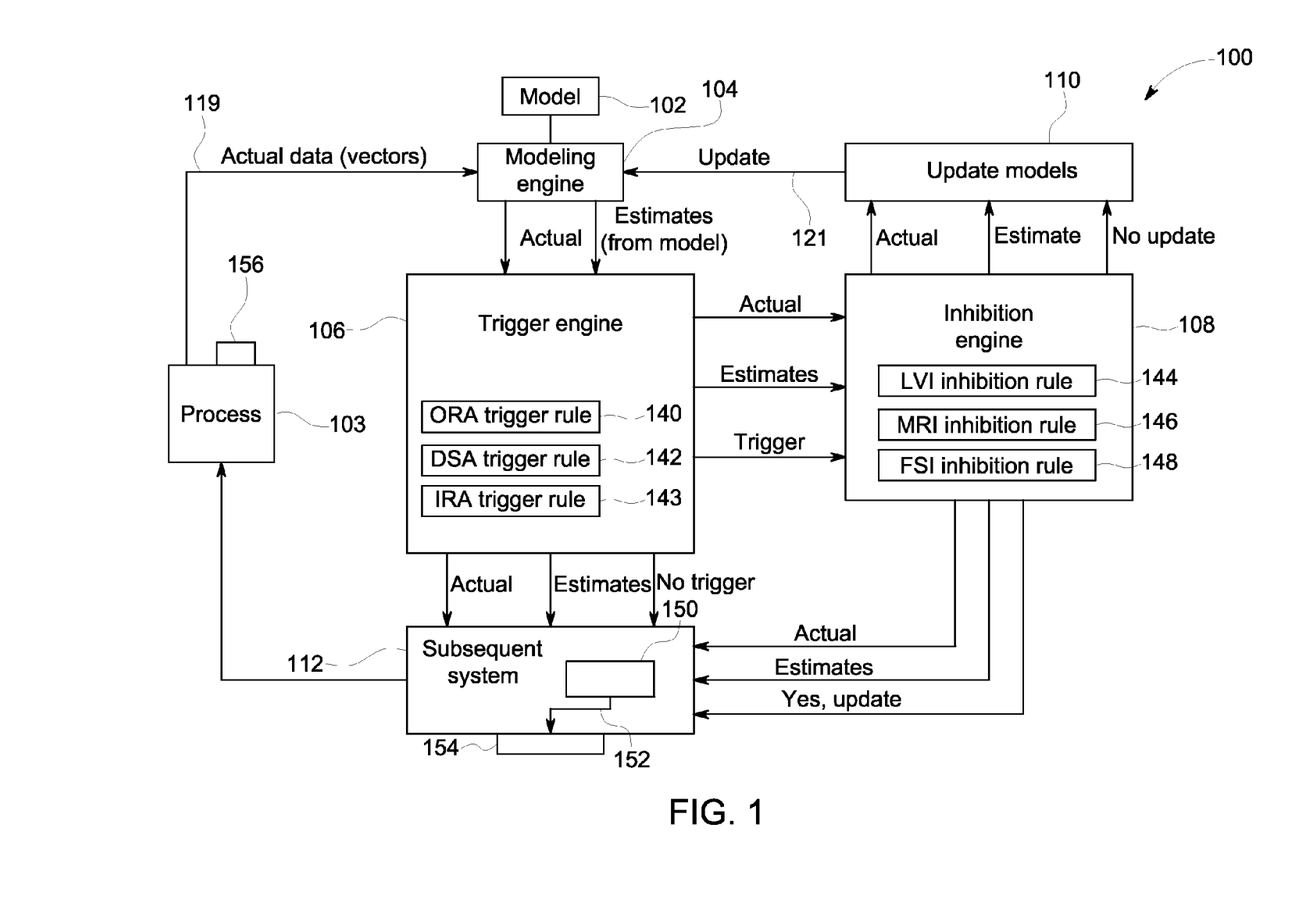
FIG. 1 comprises a block diagram showing a system that selectively modifies a model according to various embodiments of the present invention.

Referring now to FIG. 1, one example of a system that selectively updates a model is described. The system 100 includes a model 102 (the model 102 models a process 103), a modeling engine 104, a trigger engine 106, an inhibition engine 108, and an update model module 110. The trigger engine 106 and the inhibition engine 108 couple to a subsequent system 112. It will be appreciated that these elements may be implemented as any combination of electronic hardware and computer software. For example, they may be implemented as programmed computer instructions executed by a processing device such as a microprocessor.

The subsequent system 112 may include a processing device 150. Once the model 102 is updated, it can be used by the processing device 150 (e.g., a computer, server, or combinations of these or other electronic processing devices) to generate alerts 152 that are presented to a user on a graphical display medium 154 (e.g., a computer display, a cellular phone display, or any other medium that can display information graphically). These alerts, or other information provided by the user, can be utilized by a user to alter operation of the process 103 (e.g., by performing some control action on the process 103).

The model 102 is, in one aspect, a construct relating multi-dimensional associated process parameters (a repertoire of unique, multi-sensor, process states). In one example, the model 102 may be implemented in computer software and may include one or more data structures, programs, software routines, or other computer elements. A variety of empirical models can be used including neural networks, fuzzy logic models, and the like. All these empirical models employ data from the process or machine under surveillance to model and thereby monitor the process or machine. For example, the empirical modeling technique of U.S. Pat. No. 5,764,509 by Gross may be used and this document is incorporated herein by reference in its entirety. This empirical modeling technique uses a similarity operator, which is also inventively employed in the present invention in the form of global similarity and other adaptation decisioning techniques described herein. Global similarity technique of U.S. Pat. No. 7,233,886 & U.S. Pat. No. 6,859,739 may be used and these documents are incorporated herein by reference in its entirety. Generally, a similarity operation provides a scalar similarity score scaled between one extreme (typically "1" for "identical") and another extreme (typically "zero" for "completely dissimilar"), upon a comparison of two numbers. More particularly, this can be adapted for comparing two vectors having equal numbers of elements, where a similarity score is yielded for comparing each like element of the two vectors, and then averaging or otherwise statistically combining the similarity scores into one vector-to-vector similarity score.

The process 103 is any type of process such as any manufacturing process, any process in an electrical plant, any industrial process, any process in an office building. Other examples of processes are possible. The process 103 may have associated sensors 156 that obtain information.

The modeling engine 104 accesses the model 102. It may obtain information from the model 102 or send information to the model that is used to modify the model 102.

The trigger engine 106 determines whether a trigger (new state) exists. In one aspect, two trigger rules include an Out of Range Adaptation (ORA) trigger rule 140 and a Driver-tags Similarity Adaptation (DSA) trigger rule 142. The trigger rules 140 and 142 are a set of rules that determine the discovery of a non-modeled state.

The ORA trigger rule 140 indicates a new state, where at least one process driver is outside its modeled range. The ORA trigger rule 140 identifies observations (e.g., asset state vectors) that have at least one process driver parameter of the model outside its modeled state range. Process drivers are typically the set of process parameters that are considered independent of the process and are inputs to the process, such as ambient temperature. Typically, there is no fault detection performed on these parameters.

The DSA trigger rule 142 indicates a new state, which may or may not be out-of-range, but is significantly dissimilar to the model. The DSA trigger rule 142 is designed to mark observation for adaptation, when the driver parameters' global similarity is below a preset threshold (e.g., default value is 0.9). The global similarity is a single quantitative measure of how well the model generated estimate adheres to their corresponding actual values for at a given observation. A global similarity of 1 indicates identical comparison, and drops to zero with increasing dissimilarity.

These approaches may also use an IRA trigger rule 143. The IRA trigger rule 143 is designed to trigger when the residual (e.g., the actual value-the Estimated value (generated by the model for the current observation)) for at least one of the modeled process driver parameters exceeds an IRA-threshold value. In one aspect, the IRA-threshold is defined as twice the 95% confidence interval derived from the nominal residuals. In one example, the IRA trigger rule 143 indicates a new state, where at least one of the process drivers cannot be modeled successfully.

The inhibition engine 108 utilizes its algorithms to determine whether to inhibit the received trigger. The three inhibition rules are Limit Value Inhibition (LVI) rule 144, a Model Range Inhibition (MRI) rule 146, and a Fault-tags Similarity Inhibition (FSI) rule 148. Adaptation Inhibitions are sets of rules that determine whether the triggered state is a fault condition or a new valid process state.

The LVI inhibition rule 144 is designed to inhibit the observation when at least one of the process parameters, drivers or measures (process parameters which are dependent on the modeled process and are the outputs of the modeled process, such as lube oil temperature), is outside its maximum (or minimum), engineering based, predefined acceptable range (LVI-thresholds). For example, the LVI thresholds for ambient temperature in Chicago could be, in one example, −40° F. and 100° F.

The MRI inhibition rule 146 indicates that at least one of the process measures is more than a determined percentage outside its modeled range. For the MRI rule the acceptable percentage can be a function of model maturity. The MRI inhibition rule 146 is designed to inhibit the observation when at least one of the process parameters is more than a dynamically determined percentage (percent-MRI) outside the modeled range for that parameter (MRI threshold).

The FSI inhibition rule 148 is an inhibition rule that indicates that the new triggered state's dissimilarity with the model is dominated by process measures (or fault tags). The FSI inhibition rule 148 is designed to inhibit an observation triggered for adaptation, when a FSI-function is below the FSI-threshold. A FSI-function is an algebraic function relating the measure parameters (fault parameters) global similarity and the driver parameters global similarity as described elsewhere herein.

Other inhibition rules may also be used. For example, a Residual Windowed Inhibition (RWI) rule may be used that indicates that the residual of at least one of the process measures has crossed a set threshold several times over a predetermined number of samples. RWI rule is an auto-adaptation rule and works effectively on mature models. The rule is designed in similar manner as IRA rule; however instead of triggering, it is designed to inhibit when the residual for at least one of the modeled process measure parameters exceeds its RWI-threshold, a predetermined number of times (e.g., defaults to 2) over a most recent adjacent window of predetermined size (e.g., defaults to 10).

PD (or percent distance) is a quantitative model maturity measure that indicates how well a particular modeled parameter's model range spans the entire expected state space (LVI limits) of that parameter. Model maturity is defined as (1-PD). The percent distance is computed as described elsewhere herein.

The update model module 110 determines whether and how to update the model 102. It receives actual data and estimates from the modeling engine 104 and determines how to update the model 102.

In one example of the operation of the system of FIG. 1, actual data 119 (in the form of a vector) is received by the modeling engine 104. The modeling engine 104 determines an estimate of the data from information in the model 102. In this respect, the model 102 may have the estimate or the modeling engine 104 may need to determine or calculate an estimate based upon information received from the model 102. The estimates are predicted values of the current process state based upon the model. Residuals are differences between the actual and the estimated process state.

The modeling engine 104 sends actual data and estimated data to the trigger engine 106. The trigger engine 106 uses its algorithms to determine whether a new state or possible new state exists. In the event of no new state is detected, then a no trigger signal is output from the trigger engine 106 and sent to the subsequent system along with the actual data and the estimate data. Then, the subsequent system may determine, for example, anomaly detections, display the data, or store it in a database.

On the other hand, if the trigger engine 106 determines a trigger (new state) exists, then an indication of this determination, the actual data, and the estimate data are sent to the inhibition engine 108. The inhibition engine 108 utilizes its algorithms to determine whether to inhibit the received trigger determination. In other words, even though a trigger was made, the inhibition engine 108 may determine not to modify the model. In the event that the inhibition engine 108 determines to inhibit the trigger, then an inhibit signal is output from the inhibition module and sent to the subsequent system along with the actual data and the estimate data. Then, the subsequent system may determine, for example, anomaly detections, display the data, or store it in a database. On the other hand, if the inhibition engine 108 determines not to inhibit the trigger, then an indication of no inhibition, the actual data, and the estimate data are sent to the update model module 110.

The update model module 110 sends a message 121 to the modeling engine 104 to update the model 102 according to data send with the message. The modeling engine 104 then accesses the model 102 and updates the model 102. Actual and estimate data (as well as whether a trigger has been inhibited) can also be sent to the subsequent system 112 for presentation to a user or for further processing.

As mentioned, the model 102 can be used by the processing device 150 to generate alerts 152 that are presented to a user on the graphical display medium 154 (e.g., a computer display, a cellular phone display, or any other medium that can display information graphically). The user can take action based upon these alerts. For example, if the alerts indicate that a mechanical component is failing, the user can deactivate the mechanical component.

Figure 2:
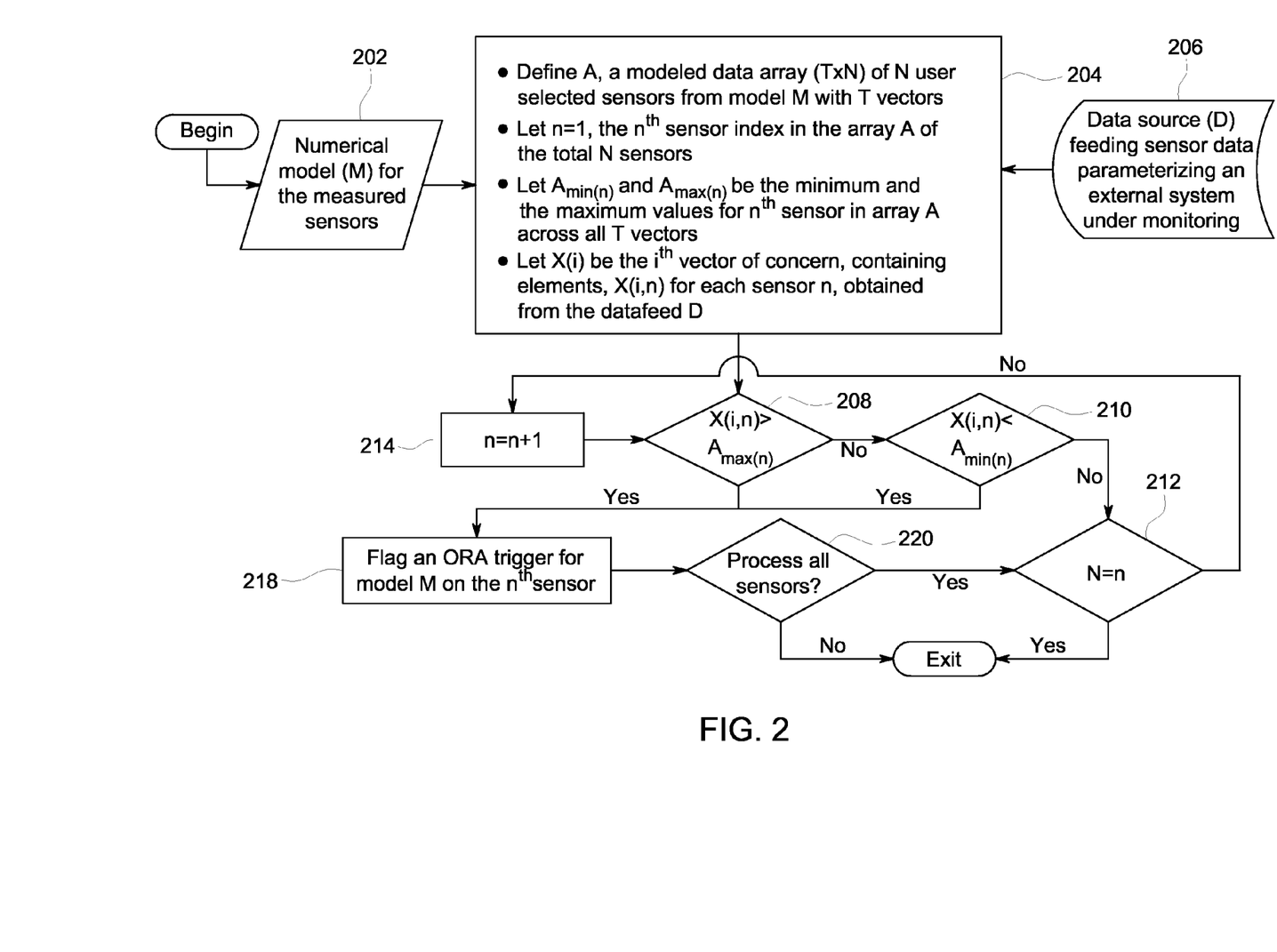
FIG. 2 comprises a flowchart showing an Out-of-Range Adaptation (ORA) trigger rule according to various embodiments of the present invention.

Referring now to FIG. 2, one example of an ORA trigger rule approach is described. At step 202, a Numerical Model (M) for the measured sensors is obtained. At step 204, various values are defined. An array A is defined and the Array A is a modeled data array [T×N] of N user selected sensors from model M with T vectors. A value n is set to 1, where n is the nth sensor index in the array A of the total N sensors. Amin(n) and Amax(n) are the minimum and the maximum values for $n^{th}$ sensor in array A across all T vectors. X(i) is the $i^{th}$ vector of concern, containing elements, X(i,n) for each sensor n, obtained from the Data source (D). The Data source (D) supplies data from any system element that produce or obtains data, e.g., sensors. At step 206, a Data source (D) feeds sensor data parameterizing an external system under monitoring.

At step 208, it is determined if X(i,n)>Amax(n). If the answer is affirmative, execution continues at step 218. If the answer is negative, execution continues at step 210.

At step 210, it is determined if X(i,n)<Amin(n). If the answer is affirmative, execution continues at step 218. If the answer is negative, execution continues with step 212.

At step 212, it is determined if N=n. If the answer is affirmative, execution ends. If the answer is negative, execution continues with step 214. At step 214, n is set to n+1. Execution continues at 208 as described above.

At step 218, an ORA trigger is flagged for model M on the $n^{th}$ sensor. At step 220, a determination is made whether to process all sensors. If the answer is affirmative, execution continues with step 212. If the answer is negative, execution ends.

Figure 3:
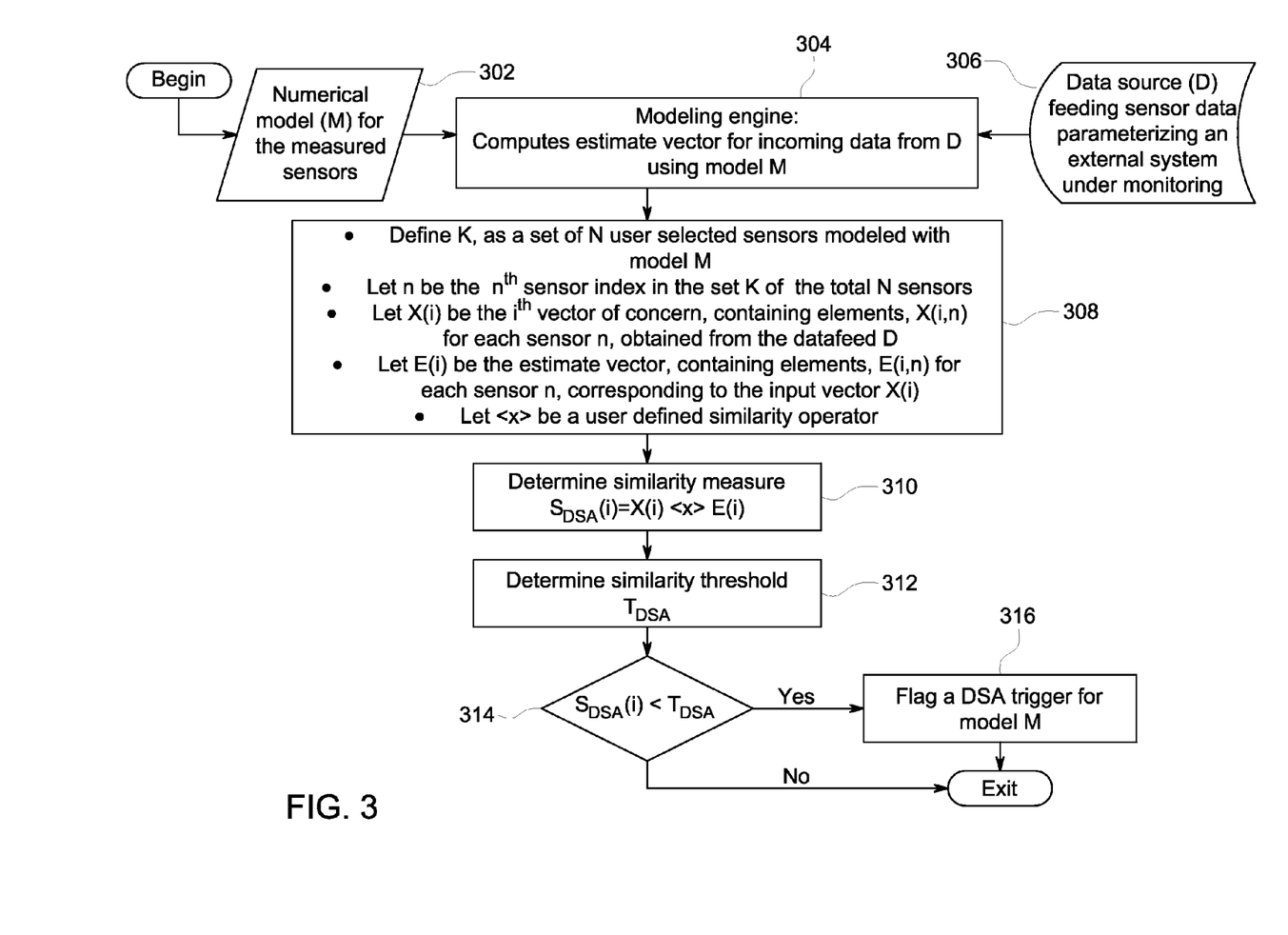
FIG. 3 comprises a flowchart of a Driver Similarity Adaptation (DSA) trigger rule according to various embodiments of the present invention.

Referring now to FIG. 3, one example of a DSA trigger rule approach is described. At step 302, a numerical Model (M) for the measured sensors is obtained. At step 304, a Model Engine computes an Estimate Vector for incoming data from the Data source (D) using model M. At step 306, the Data source (D) feeds sensor data parameterizing an external system under monitoring.

At step 308, the set K is defined. K is a set of N user selected sensors modeled with model M. N is the $n^{th}$ sensor index in the set K of the total N sensors. X(i) is the $i^{th}$ vector of concern, containing elements, X(i,n) for each sensor n, obtained from the Data source (D). E(i) is the estimate vector, containing elements, E(i,n) for each sensor n, corresponding to the input vector X(i). And, <x> is set to be a user defined similarity operator.

At step 310, a similarity measure $S_{DSA}(i)=X(i)<x>E(i)$ is determined. At step 312, a similarity threshold $T_{SA}$ is determined.

At step 314, is determined if $S_{DSA}(i)<T_{DSA}$. If the answer is affirmative, execution continues at step 316. If the answer is negative, execution ends. At step 316, a DSA trigger for model M is flagged. Execution then ends.

Figure 4:
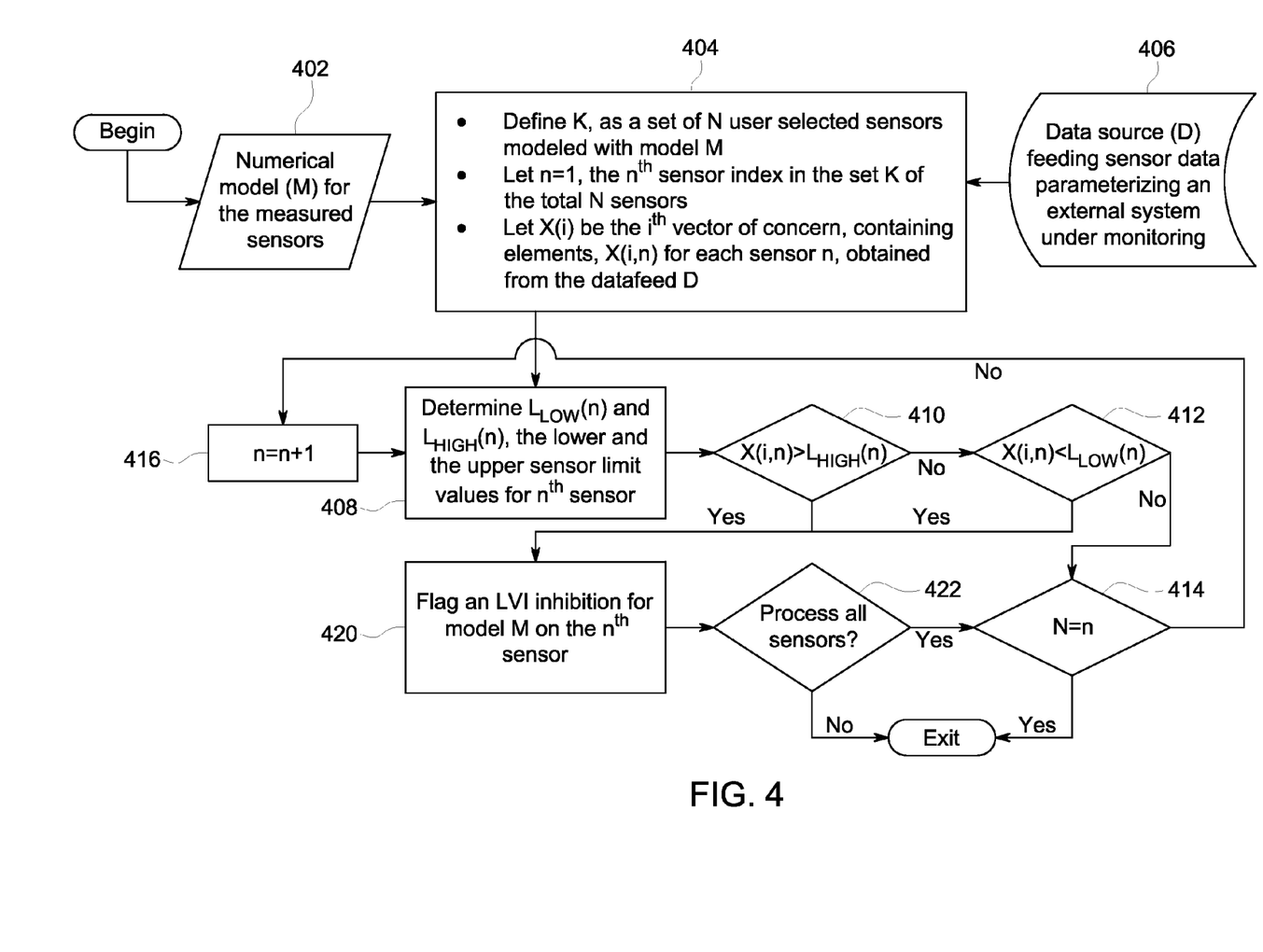
FIG. 4 comprises a flowchart for a Limit Value Inhibition (LVI) rule according to various embodiments of the present invention.

Referring now to FIG. 4, one example of an LVI inhibition rule approach is described. At step 402, a Numerical Model (M) for the measured sensors is determined. At step 404, a set K is defined. K is a set of N user selected sensors modeled with model M. Also, the value n is set, where n=1, the $n^{th}$ sensor index in the set K of the total N sensors. X(i) is the $i^{th}$ vector of concern, containing elements, X(i,n) for each sensor n, obtained from the Data source (D) feed.

At step 406, Data source (D) feeds sensor data parameterizing an external system under monitoring. At step 408, a determination is made of $L_{low}(n)$ and $L_{high}(n)$, the lower and the upper sensor limit values for $n^{th}$ sensor. At step 410, it is determined if $X(i,n)>L_{high}(n)$. If the answer is affirmative, execution continues at step 420. If the answer is negative, execution continues at step 412.

At step 412, it is determined if $X(i,n)<L_{low}(n)$. If the answer is affirmative, execution continues at step 420. If the answer is negative, execution continues at step 414.

At step 414, it is determined if N=n. If the answer is affirmative, execution ends. If the answer is negative, execution continues at step 416.

At step 416, n is set to be n=n+1. Execution continues at step 408 as described above. At step 420, an LVI inhibition for model M on the $n^{th}$ sensor is flagged. Execution continues at step 422 where it is determined whether to process all sensors. If the answer is affirmative, execution continues at step 414. If the answer is negative, execution ends.

Figure 5:
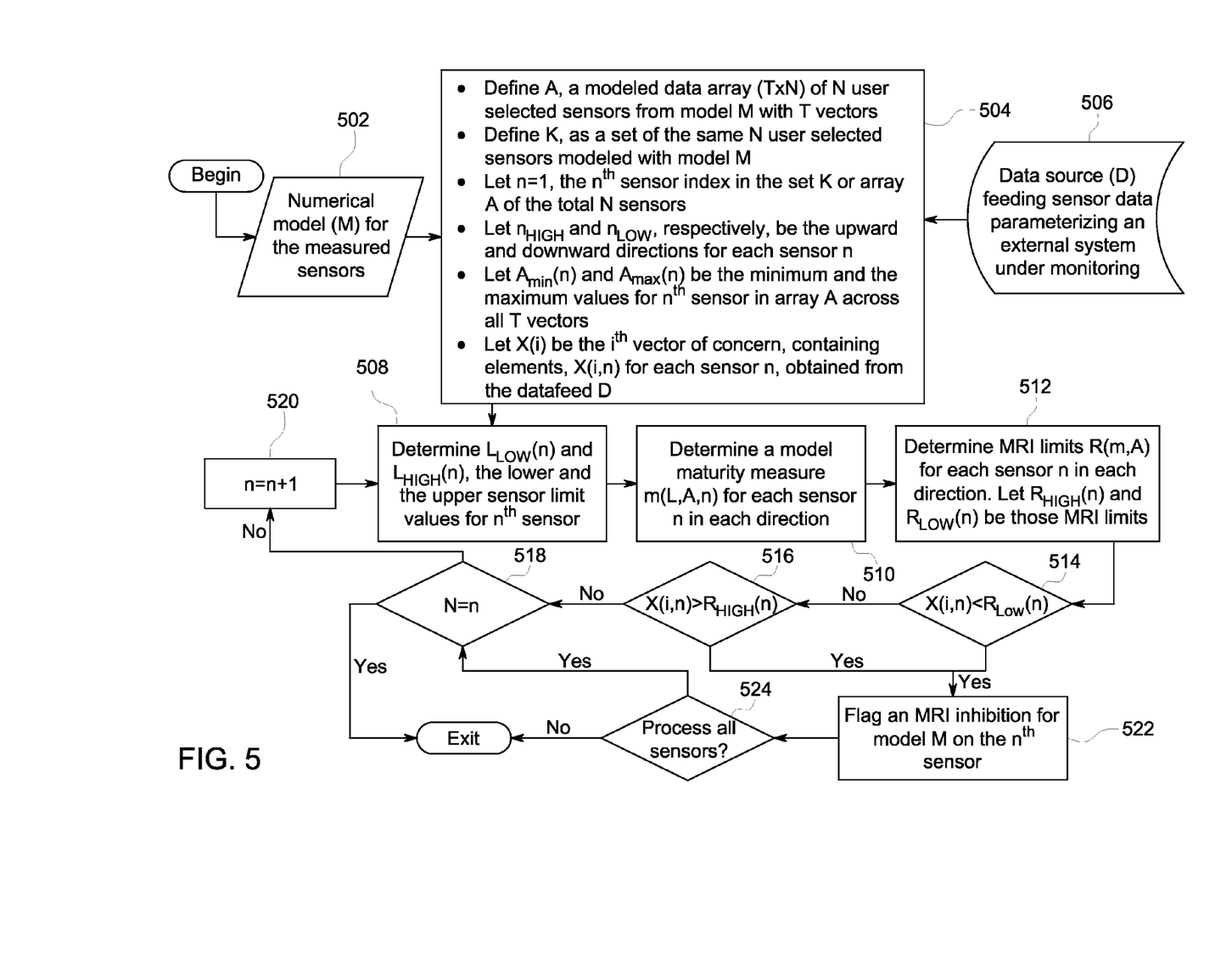
FIG. 5 comprises a flowchart for a Model Range Inhibition (MRI) rule according to various embodiments of the present invention.

Referring now to FIG. 5, one example of a MRI inhibition rule approach is described. At step 502, a Numerical Model (M) for the measured sensors is determined.

At step 504, an array A is defined. A is a modeled data array [T×N] of N user selected sensors from model M with T vectors. The set K is also defined. K is a set of the same N user selected sensors modeled with model M. And, n=1, the nth sensor index in the array A of the total N sensors. Further, $n_{high}$ and $n_{low}$, respectively, are the upward and downward directions for each sensor n. Amin(n) and Amax(n) are the minimum and the maximum values for $n^{th}$ sensor in array A across all T vectors. And, X(i) be the $i^{th}$ vector of concern, containing elements, X(i,n) for each sensor n, obtained from the Data source (D).

At step 506, Data source (D) feeds sensor data parameterizing an external system under monitoring. At step 508, $L_{low}(n)$ and $L_{high}(n)$, are determined and these are the lower and the upper sensor limit values for $n^{th}$ sensor. At step 510, a model maturity measure m(L,A,n) for each sensor n in each direction is determined. At step 512, MRI limits R(m,A) for each sensor n in each direction are determined where $R_{high}(n)$ and $R_{low}(n)$ are those MRI limits.

At step 514, it is determined if $X(i,n)<R_{low}(n)$. If the answer is affirmative, execution continues at step 522. If the answer is negative, execution continues at step 516.

At step 516, is determined if $X(i,n)>R_{high}(n)$. If the answer is affirmative, execution continues at step 522. If the answer is negative, execution continues at step 518.

At step 518, it is determined if N=n. If the answer is affirmative, execution ends. If the answer is negative, execution continues at step 520. At step 520, a setting is made of n=n+1. Execution then continues at step 508 as described above.

At step 522, an MRI inhibition for model M on the $n^{th}$ sensor is flagged. At step 524, it is determined whether to process all sensors. If the answer is affirmative, execution continues at step 518. If the answer is negative, execution ends.

Figure 6A:
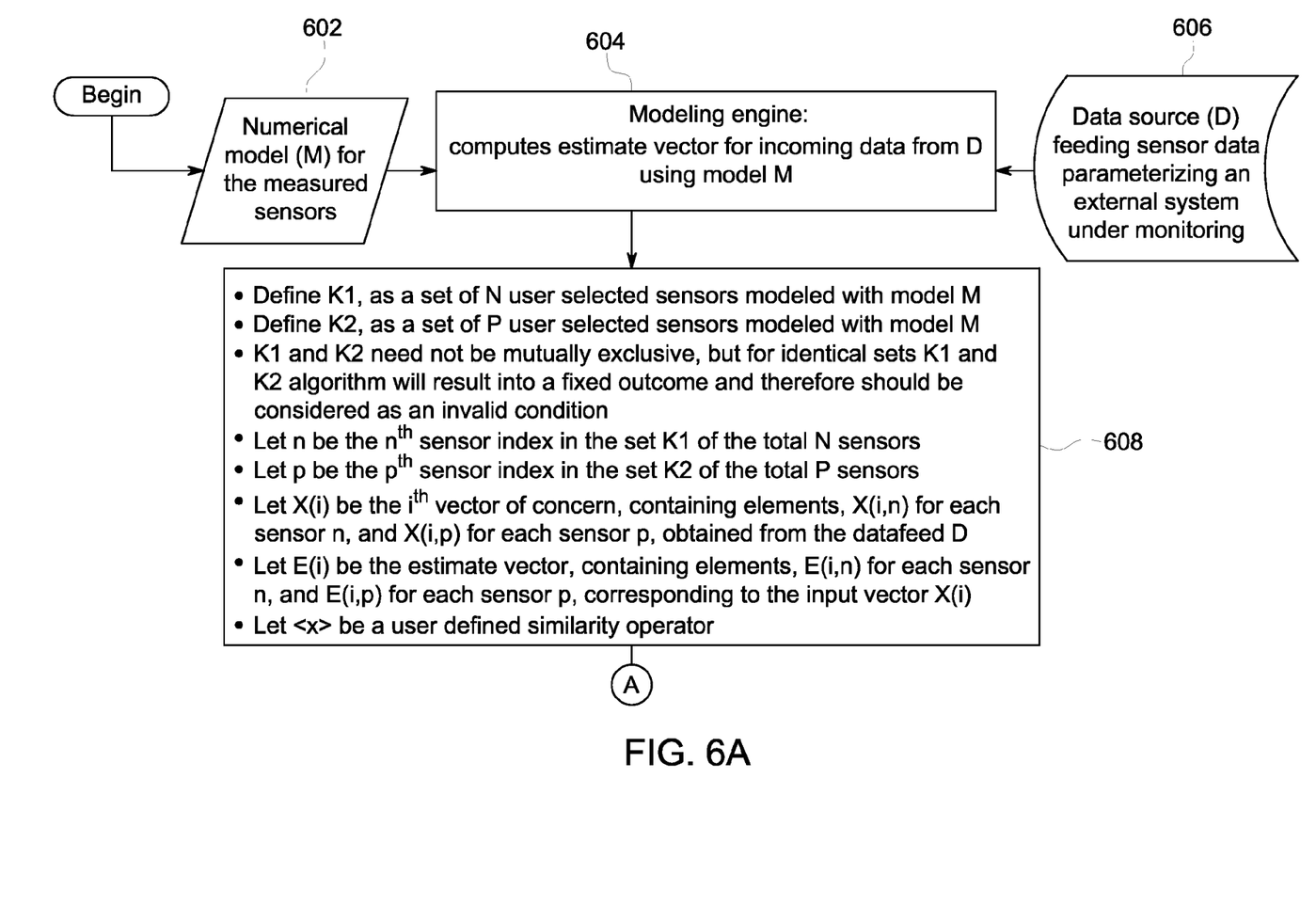
FIG. 6 comprises a flowchart for Fault Similarity Inhibition (FSI) rule according to various embodiments of the present invention.
Figure 6B:
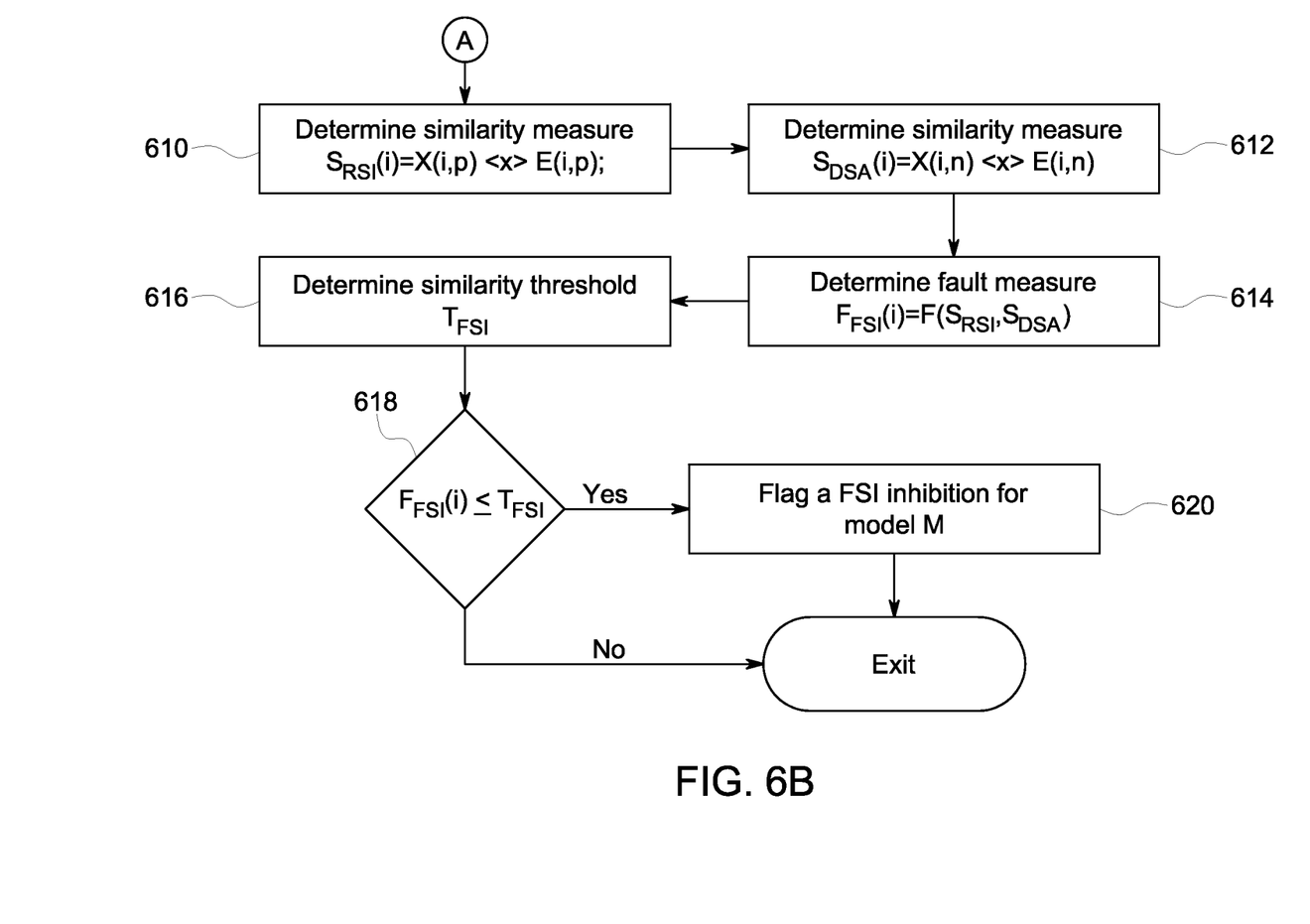

Referring now to FIG. 6, one example of a FSI inhibition approach is described. At step 602, a Numerical Model (M) for the measured sensors is obtained. At step 604, a Model Engine computes an estimate vector for incoming data from the Data source (D) using model M. At step 606, a Data source (D) feeds sensor data parameterizing an external system under monitoring.

At step 608, a set K1 is defined. K1 is a set of N user selected sensors modeled with model M. A set K2 is defined as a set of P user selected sensors modeled with model M. K1 and K2 need not be mutually exclusive, but for identical sets K1 and K2 the algorithm will result into a fixed outcome and therefore should be considered as an invalid condition. Further, n is the $n^{th}$ sensor index in the set K1 of the total N sensors. And, p is the $p^{th}$ sensor index in the set K2 of the total P sensors. Also, X(i) is the $i^{th}$ vector of concern, containing elements, X(i, n) for each sensor n, and X(i,p) for each sensor p, obtained from the Data source (D). Then, E(i) is the estimate vector containing elements, E(i,n) for each sensor n, and E(i,p) for each sensor p, corresponding to the input vector X(i). Further, <x> is defined to be a user defined similarity operator.

At step 610, a similarity measure is determined where $S_{RSI}=X(i, p)<x>E(i, p)$. At step 612, a similarity measure is determined where $S_{DSA}=X(i,n)<x>E(i,n)$. At step 614, a fault measure is determined where $F_{FSI}(i)=F(S_{RSI}, S_{DSA})$. At step 616, a similarity threshold $T_{FSI}$ is determined.

At step 618, it is determined if $F_{FSI}(i)<=T_{FSI}$. If the answer is negative, execution ends. If the answer is affirmative, then execution continues at step 620. At step 620, an FSI inhibition is flagged for the model M. Execution then ends.

Figure 7:
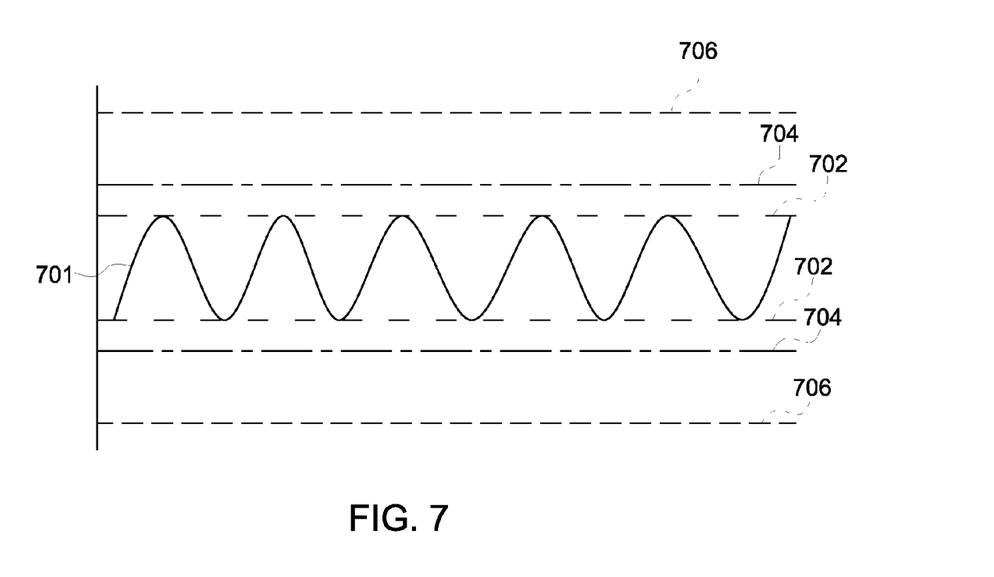
FIG. 7 comprises a graph showing the operation of the Model Range Inhibition (MRI) rule according to various embodiments of the present invention.

Referring now to FIG. 7, one example of a graph that illustrates various aspects of the MRI inhibition rule is described. A sensor value 701 varies with time as shown. Model limits 702 are displayed about the sensor value 701. The model limits 702 have both a positive and negative side (aspect) as shown.

MRI limits 704 are calculated as described herein and also have a positive and negative side. LVI limits 706 are set by the user; for example, with the values obtained from the Original Equipment manufacturer (OEM).

In operation, a measure of maturity is calculated. This is determined by:

$$MM_x = 1 - PD_x;$$

$$PD_x = \frac{|LVI_x - \text{Model limit}_x|}{|LVI_{max} - LVI_{min}|}$$

x denotes the upper or the lower respective limits $MRI_x$ limits 704 are calculated as described herein and also have upper and lower limits. Model limit$_x$ is the upper or the lower model limits 702.

Percent Distance (PD) is a measure of how close the model limit 702 is to the LVI Limits 706 and defines maturity. Next, the MRI measure is determined based upon the maturity and predetermined function. For example:

$$\% \ MRI_x = A*\exp(B*(1-MM_x))$$

This equation can be used where A is the MRI percentage at which a mature model inhibits. One value for A is 0.045 (e.g., 4.5%) B is the MRI variability factor. In one example, B=3.7. PD is the percent distance and is proportional to a quantitative model maturity measure (MM) that measures how well a particular model parameter's model range spans the entire expert state space (LVI limits) and has been defined above.

Then, MRI is calculated:

$$MRI_x = \text{Model Limit}_x \pm \text{Model Range}*\% \ MRI_x$$

The various values in the equation are defined above. Model Range=Model Limit$_{max}$−Model Limit$_{min}$. Once the MRI Limit is calculated, the actual received values from drivers are compared to the MRI Limit. If the limits are exceeded, inhibition prevents a state change in the model that was initially triggered.

Figure 8:
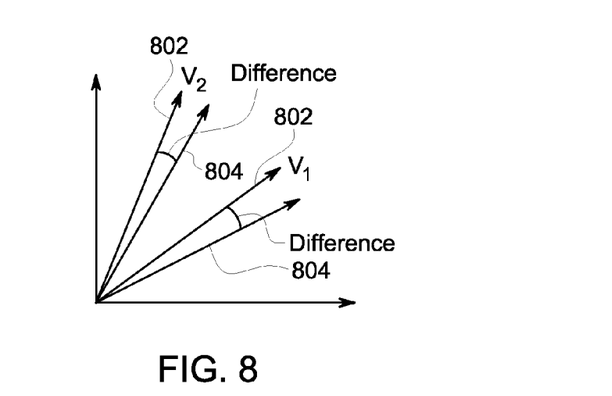
FIG. 8 comprises a graph of the FSI approach according to various embodiments of the present invention.
Figure 9:
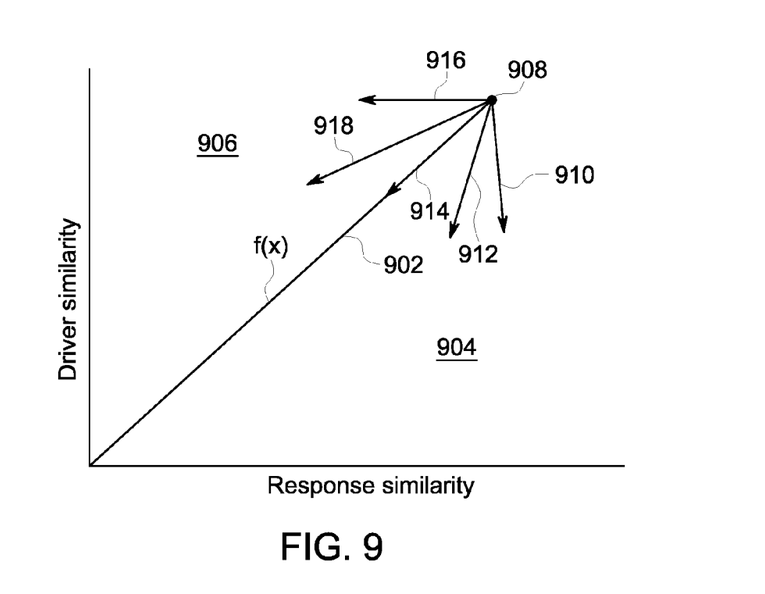
FIG. 9 comprises a graph of the FSI approach according to various embodiments of the present invention.

Referring now to FIGS. 8 and 9, two example graphs showing the FSI approach are described. FIG. 8 shows a graph of differences between expected values 802 and actual values 804, and inversely proportional to the similarity measure between the two vectors. The x-axis and the y-axis represents the two sensors of a two sensor system. This graph can be extrapolated into N-dimensions for N sensored systems.

FIG. 9 shows a function showing driver similarity along the y-axis and response similarity along the x-axis. By "driver similarity" and as used herein, it is meant as a measure of how similar the expected vector is to the actual vector in the n dimensional space of process driver sensors (sensors deemed as process drivers by the user). By "response similarity" and as used herein, it is meant as a measure of how similar the expected vector is to the actual vector in the p dimensional space of process response sensors (sensors deemed as process response by the user). A function f(x) 902 separates an acceptable region 904 from an unacceptable region 906. In this example, the function f(x) is a linear function, but it will be appreciated that other types of functions (e.g., exponential functions) can also be used.

A point 908 represents perfect vector/model similarity. A vector 910 represents a driver similarity value changing but no change in response similarity (indicating that this change is acceptable).

A vector 912 shows a driver similarity changing but not much change in response similarity (indicating that this change is acceptable). A vector 914 shows a driver similarity changing in proportion to the response similarity (indicating that this change is acceptable). A vector 916 shows a response similarity changing but no change in driver similarity (indicating that this change is unacceptable). A vector 918 shows a response similarity changing a lot, but a driver similarity changing a little (indicating that this change is unacceptable).

The vectors 910, 912, and 914 are in the acceptable region 904. The vectors 916 and 918 are in the unacceptable region 906. In this example, first the similarity measures are determined (by FIG. 8) and then this is compared to the graph (of FIG. 9) as described above. When the changes are acceptable, the change can be used to modify the model. When the changes are unacceptable, the change is not used to modify the model.

Figure 10:
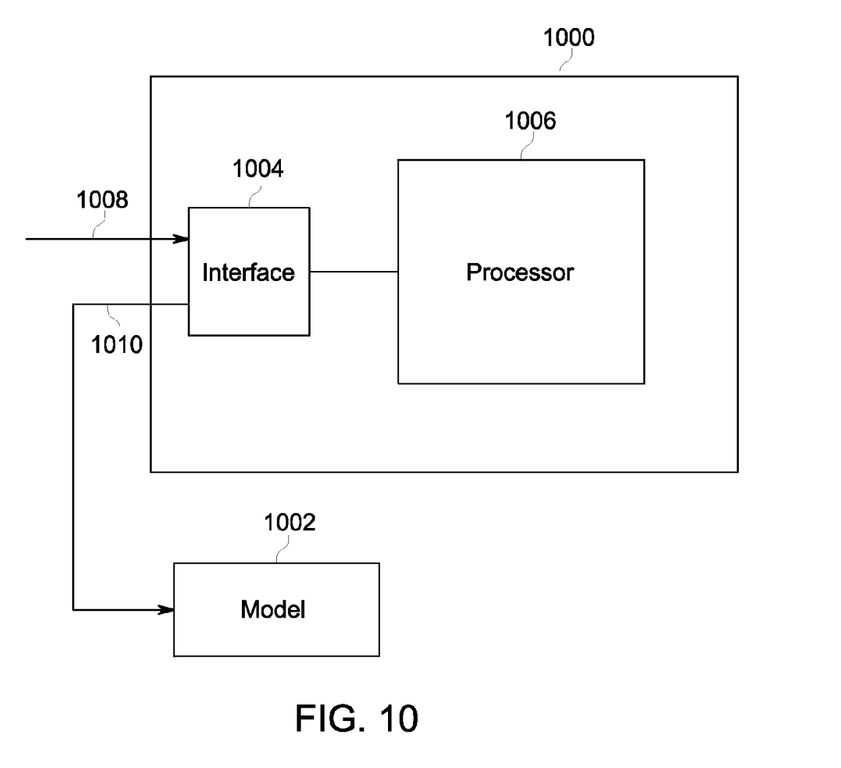
FIG. 10 comprises a block diagram of an apparatus that modifies a model according to various embodiments of the present invention.

Referring now to FIG. 10, one example of an apparatus 1000 that changes a model 1002 is described. It will be appreciated that the apparatus 1000 implements many or all of the functional blocks with respect to FIGS. 1-6. The apparatus 1000 may be implemented as a single physical apparatus but it also will be appreciated that it may spread its processing functions over multiple physical devices and multiple locations.

The apparatus 1000 is configured to determine whether to modify the process model 1002 includes an interface 1004 and a processor 1006. The interface 1004 has an input 1008 and an output 1010 and the input 1008 is configured to receive a vector of actual sensor values and a maturity of the model 1002. The maturity is defined for each of a plurality of sensors and further defined in an upward direction and a downward direction for each of the sensors.

The processor 1006 is coupled to the interface 1004 and is configured to determine a model range inhibition (MRI) measure based upon the maturity of the model 1002 and the determined function. The processor 1006 is configured to determine an MRI limit based upon the MRI measure, and compare the received vector to the MRI limit. The processor 1006 is configured to selectively change the model 1002 based upon the comparing via one or more control signals sent at via output 1010.

In some aspects, the interface 1004 is configured to further receive at the input 1008 a first vector. The first vector has actual values for driver sensors. The interface 1004 also receives a second vector and the second vector has actual values for response sensors. The interface 1004 also receives a third vector, the third vector has an estimate values for driver sensors. The interface 1004 further receives a fourth vector and the fourth vector has an estimate values for response sensors. The interface 1004 also receives a function that provides a set of boundaries between acceptable observations and unacceptable observations.

In other aspects, the processor 1006 is configured to determine a first measure of similarity between the first vector and the third vector, and a second measure of similarity between the second vector and the fourth vector. The processor 1006 is further configured to compare the first measure of similarity, the second measure of similarity, and the function and selectively change the model 1002 based upon the comparison.

It will be appreciated by those skilled in the art that modifications to the foregoing embodiments may be made in various aspects. Other variations clearly would also work, and are within the scope and spirit of the invention. The present invention is set forth with particularity in the appended claims. It is deemed that the spirit and scope of that invention encompasses such modifications and alterations to the embodiments herein as would be apparent to one of ordinary skill in the art and familiar with the teachings of the present application.

What is claimed is:

1. A method of determining whether to modify a process model, the method comprising:
   receiving actual sensor values, the actual sensor values being in the form of a vector;
   determining a maturity of a model, the maturity being defined for each of a plurality of sensors and further defined by an upper limit and a lower limit for each sensor value;
   determining a function that translates model maturity to model range inhibition measure;
   determining a model range inhibition (MRI) measure based upon the maturity of the model and the determined function;
   determining an MRI limit based upon the MRI measure; and
   comparing the received vector to the MRI limit and selectively changing the model based upon the comparing.

2. The method of claim 1 further comprising:
   receiving actual values for driver sensors, the actual values for driver sensors being in the form of a first vector;
   receiving actual values for response sensors, the actual values for response sensors being in the form of a second vector;
   receiving estimate values for driver sensors, the estimate values for driver sensors being in the form of a third vector;
   receiving estimate values for response sensors, the estimate values for response sensors being in the form of a fourth vector;
   determining a function that provides a set of boundaries between acceptable observations and unacceptable observations;
   determining a first measure of similarity between the first vector and the third vector;
   determining a second measure of similarity between the second vector and the fourth vector; and comparing the first measure of similarity, the second measure of similarity, and the function and selectively changing the model based upon the comparing.

3. The method of claim 1 further comprising determining whether a component represented by the model is near failure.

4. The method of claim 3 further comprising generating an alert to a user when the component is near failure.

5. The method of claim 4 further comprising presenting the alert to a user on a graphical display medium.

6. A method of determining whether to modify a process model, the method comprising:
receiving actual values for driver sensors, the actual values for driver sensors being in the form of a first vector;
receiving actual values for response sensors, the actual values for response sensors being in the form of a second vector;
receiving estimate values for driver sensors, the estimate values for driver sensors being in the form of a third vector;
receiving estimate values for response sensors, the estimate values for response sensors being in the form of a fourth vector;
determining a function that provides a set of boundaries between acceptable observations and unacceptable observations;
determining a first measure of similarity between the first vector and the third vector;
determining a second measure of similarity between the second vector and the fourth vector; and
comparing the first measure of similarity, the second measure of similarity, and the function and selectively changing a model based upon the comparing.

7. The method of claim 6 further comprising determining whether a component represented by the model is near failure.

8. The method of claim 7 further comprising generating an alert to a user when the component is near failure.

9. The method of claim 8 further comprising presenting the alert to a user on a graphical display medium.

10. An apparatus that is configured to determine whether to modify a process model, the apparatus comprising:
an interface having an input and an output, the input configured to receive a vector of actual sensor values and a maturity of a model, the maturity being defined for each of a plurality of sensors and further defined by an upper limit and a lower limit for each sensor value;
a processor, the processor coupled to the interface, the processor configured to determine a model range inhibition (MRI) measure based upon the maturity of the model and a determined function that translates model maturity to model range inhibition measure, the processor configured to determining an MRI limit based upon the MRI measure, and compare the received vector to the MRI limit, the processor configured to selectively change the model based upon the comparing via one or more control signals sent via the output.

11. The apparatus of claim 10 wherein the interface is configured to further receive at the input actual values for driver sensors in the form of a first vector, actual values for response sensors in the form of a second vector, estimate values for driver sensors in the form of a third vector, estimate values for response sensors in the form of a fourth vector; and determining a function that provides a set of boundaries between acceptable observations and unacceptable observations;
wherein the processor is configured to determine a first measure of similarity between the first vector and the third vector, and a second measure of similarity between the second vector and the fourth vector; and wherein the processor is further configured to compare the first measure of similarity, the second measure of similarity, and the function and selectively change the model based upon the comparison.

12. The apparatus of claim 10 wherein the processor is configured to determine whether a component represented by the model is near failure.

13. The apparatus of claim 12 wherein the processor is configured to generate an alert to a user at the output when the component is near failure.

14. The apparatus of claim 13 wherein the alert is presented to a user on a graphical display medium.

* * * * *